US008263003B2

(12) United States Patent
Abadie et al.

(10) Patent No.: US 8,263,003 B2

(45) Date of Patent: Sep. 11, 2012

(54) DEVICE FOR TRANSPORTING AND/OR STORING RADIOACTIVE MATERIALS AND FOR THE CONTROLLED RELEASE OF OXYGEN IN AN ENCLOSED HOUSING

(75) Inventors: Pascale Abadie, Fontenay-le-Fleury (FR); Paul Abadie, legal representative, Puntous (FR); Françoise Abadie, legal representative, Puntous (FR); Hervé Issard, Vanves (FR); Valentin Rohr, Trappes (FR)

(73) Assignee: TN International, Montigny-le-Bretonneux (FR)

( * ) Notice: Subject to any disclaimer, the term of this patent is extended or adjusted under 35 U.S.C. 154(b) by 149 days.

(21) Appl. No.: 12/809,559

(22) PCT Filed: Dec. 19, 2008

(86) PCT No.: PCT/EP2008/068002

§ 371 (c)(1), (2), (4) Date: Sep. 20, 2010

(87) PCT Pub. No.: WO2009/083491

PCT Pub. Date: Jul. 9, 2009

(65) Prior Publication Data

US 2011/0095208 A1 Apr. 28, 2011

(30) Foreign Application Priority Data

Dec. 21, 2007 (FR) ..................................... 07 60231

(51) Int. Cl.

| | |
|---|---|
| ***B01J 19/00*** | (2006.01) |
| ***B01D 53/22*** | (2006.01) |
| ***G05B 17/00*** | (2006.01) |

(52) U.S. Cl. ........ 422/116; 422/108; 422/164; 422/165; 422/166; 423/248

(58) Field of Classification Search .................. 422/108, 422/116, 164, 165, 166; 423/248

See application file for complete search history.

(56) References Cited

U.S. PATENT DOCUMENTS

| | | | | |
|---|---|---|---|---|
| 4,209,491 | A * | 6/1980 | Rich, III | 422/110 |
| 2008/0061007 | A1 * | 3/2008 | Abadie et al. | 210/763 |

FOREIGN PATENT DOCUMENTS

| | | | |
|---|---|---|---|
| DE | 37 30743 | A1 | 3/1989 |
| DE | 43 43 500 | A1 | 6/1995 |
| EP | 0 019 907 | A1 | 12/1980 |
| FR | 2 874 120 | A1 | 2/2006 |

OTHER PUBLICATIONS

International Search Report mailed Mar. 4, 2009, issued in corresponding International Application No. PCT/EP2008/068002, filed Dec. 19, 2008.

* cited by examiner

*Primary Examiner* — Walter D Griffin

*Assistant Examiner* — Lessanework Seifu

(74) *Attorney, Agent, or Firm* — Christensen O'Connor Johnson Kindness PLLC

(57) ABSTRACT

The invention relates to a device (1) for transporting and/or storing radioactive materials (10), comprising a closed enclosure (8) and a system (12, 16) for securing said closed enclosure, said system comprising catalytic means (12) for recombining hydrogen and oxygen into water, placed in said closed enclosure. According to the invention, the system for securing said closed enclosure further comprises a device (16) for the controlled release of oxygen in said closed enclosure (8).

14 Claims, 4 Drawing Sheets

DEVICE FOR TRANSPORTING AND/OR STORING RADIOACTIVE MATERIALS AND FOR THE CONTROLLED RELEASE OF OXYGEN IN AN ENCLOSED HOUSING

FIELD OF THE INVENTION

The present invention relates generally to the field of securing a closed enclosure defined in a device for transporting and/or storing radioactive materials.

STATE OF THE RELATED ART

In such closed enclosures containing radioactive materials, in the presence of water or solid or liquid hydrogenated compounds, the radiations emitted by the radioactive materials induce, by means of radiolysis, a conversion of some of said water into various gases including hydrogen and oxygen.

Since the presence of hydrogen in the enclosure clearly impairs the safety of the entire transport and/or storage device, due to high risks of flammability, explosiveness and pressure rises generated, it is usually sought to remove this hydrogen.

For this purpose, confinement enclosures may be equipped with a catalyst for recombining oxygen and hydrogen into water (or a catalytic hydrogen recombiner), in contact whereof hydrogen combines with the oxygen found in the closed enclosure to form water according to the catalytic hydrogen oxidation mechanism.

This catalytic oxidation principle functions until the oxygen initially contained in the closed enclosure is entirely used up. However, as soon as oxygen remains at insufficient concentrations in the closed enclosure, the abovementioned risks of flammability, explosiveness and pressure rises, caused by the presence of excessive hydrogen, recur.

To make up for the lack of oxygen, one solution consists of initially introducing, into the closed enclosure, means for releasing oxygen, consisting for example of a solid source of gaseous oxygen, as disclosed in the document FR-A-2 874 120 in particular. This solid source takes the form of a peroxide, which, in contact with the water created in the closed enclosure, releases gaseous oxygen.

Oxygen is thus generated regularly in the enclosure, but in uncontrollable quantities, liable to give rise to oxygen deficiency and therefore excessive non-recombined hydrogen, with the risks described above.

From the prior art, the document EP-A-0 383 153 is also known, describing a device for reducing the internal pressure in a radioactive waste storage device. This device comprises a chamber placed in a side body opening or opening of the cover of the nuclear waste storage device. The inside of this chamber receives a catalyst and comprises an opening connected to the internal storage space of the storage device, wherein a sintered metal candle is placed. The catalyst is separated from the outside by a metal gauze, a plate permeable to water vapour or a sintered metal cover.

The hydrogen formed in the storage device passes through the sintered metal candle and reaches the catalyst where the hydrogen is oxidised into water by the oxygen in the air. For example, the catalyst used comprises a precious metal, for example palladium on an inert substrate, for example made of alumina.

In the solution described by this document, the internal storage space cannot be considered to form a closed enclosure of a device for transporting and/or storing radioactive materials, given that this space cannot be closed, hermetic and perfectly tight, due to the need to connect same to the ambient air, providing the external source of oxygen.

SUMMARY OF THE INVENTION

Therefore, the aim of the invention is that of remedying the abovementioned drawbacks at least partially, relating to embodiments of the prior art.

For this purpose, the invention firstly relates to a device for transporting and/or storing radioactive materials, comprising a closed enclosure and a system for securing said closed enclosure, said system comprising catalytic means for recombining hydrogen and oxygen into water, placed in said closed enclosure. According to the invention, the system for securing said closed enclosure further comprises a device for the controlled release of oxygen in said closed enclosure.

With the present invention, the release of oxygen in the closed enclosure now being controlled, the risks of insufficient and/or excess oxygen in said enclosure are advantageously reduced to nil, throughout the duration of the storage and/or transport of the radioactive materials.

It is noted that the controlled release of oxygen in the enclosure may be automated or not. In the latter case, this may particularly consist of means enabling an operator to start and/or stop the oxygen supply in the enclosure manually, from the outside thereof. Furthermore, while the oxygen release is preferably activated, manually or automatically, following the detection of a low oxygen concentration, this activation may be performed differently, for example at several predetermined times, i.e. predetermined time intervals which are preferably regular. Furthermore, the invention works with any type of oxygen release means, enabling a controlled release thereof, these means being positioned inside or outside the closed enclosure. For example, this may consist of solid, liquid or gaseous sources of oxygen, which, if they are to be arranged inside the closed enclosure, are preferably introduced therein prior to the closure of the transport and/or storage device, to subsequently remain there permanently.

In this way, the device for the controlled release of oxygen is an integral part of the system for securing the closed enclosure of the device for transporting and/or storing radioactive materials. Nevertheless, this system may comprise other active means, without falling outside the scope of the invention. For example, the active means may not only comprise a catalyst for recombining oxygen and hydrogen into water, but also a desiccant agent, to limit the presence of water inside the enclosure. Indeed, this presence causes high risks of corrosion, such that it may prove to be necessary to purge same, i.e. remove water, using the abovementioned desiccant agent. As illustrative examples, the recombination catalyst is particularly selected from catalysts coated with platinum or palladium, and may take the form of palladium deposited on alumina, jointly enabling catalysis and the required drying.

Naturally, these active means are determined and selected according to the type of elements to be removed inside the closed enclosure of the transport and/or storage device, in order to purge and/or secure said enclosure.

According to one preferred embodiment, said device for the controlled release of oxygen comprises:

- means for obtaining data on the oxygen concentration inside said closed enclosure;
- controllable oxygen release means for releasing oxygen inside said closed enclosure; and
- means for controlling said oxygen release means.

In this case, the oxygen release control may advantageously result from tracking the data on the oxygen concentration in the closed enclosure, such that the oxygen is released manually or in an automated manner. Furthermore, as explained hereinafter, the data on the oxygen concentration may relate to the oxygen concentration itself or alternatively to the concentration of another gas found in the enclosure, correlated with the oxygen concentration.

Preferably, said means for obtaining data on the oxygen concentration are connected to the control means so as to supply same with a value of the oxygen concentration inside said closed enclosure, said control means being devised to order the release means to release oxygen, preferably in a predetermined quantity, when said value falls below a predetermined oxygen concentration threshold.

With this preferred configuration, the control means thus automatically order the release of oxygen when the concentration thereof falls below a predetermined threshold, for example set between 2 and 10% of the volume of the closed enclosure, and more preferentially between 3 and 6% of said volume. For example, once the oxygen release has been ordered, it may be maintained while the value of the oxygen concentration provided by the detection means remains below the abovementioned threshold. In such a case, the release of oxygen is stopped once the threshold is reached, and a further release of oxygen is only ordered when the detected value again falls below the predetermined threshold.

Alternatively, it is possible to ensure that, once the oxygen release has been ordered, a predetermined quantity of oxygen is introduced into the enclosure, said predetermined quantity being for example set such that, following the release thereof in said closed enclosure, the oxygen concentration is raised to a value between 5 and 60%, and more preferentially between 20 and 30%.

Also preferentially, said means for obtaining data on the oxygen concentration are detection means for detecting the oxygen concentration inside said closed enclosure, preferably of the oxygen concentration sensor type. Nevertheless, alternative solutions may be envisaged, wherein the means for obtaining data on the oxygen concentration are not devised to detect the oxygen concentration directly, said concentration being obtained indirectly on the basis of one or a plurality of other values correlated therewith, such as a concentration value of another gas found in the enclosure. These gases wherein the concentration may be detected directly using suitable means to obtain data on the oxygen concentration particularly include hydrogen and carbon monoxide, or hydrocarbons, $I_2$, $Cl_2$ or $CO_2$. Estimations and/or calculations known to those skilled in the art may then be used, on the basis of one or a plurality of these detected concentration values, to obtain data on the oxygen concentration inside said closed enclosure, to compare same to the predetermined oxygen concentration threshold.

Moreover, in the preferred scenario of the use of detection means for detecting the oxygen concentration inside said closed enclosure, said means preferentially comprise one or a plurality of oxygen concentration sensors, arranged inside said closed enclosure. In the case of a plurality of sensors, the solution proves to be effective in deducing the mean oxygen concentration inside the enclosure, in the event of poor homogeneity therein.

Preferably, said device for the controlled release of oxygen is devised to enable a plurality of oxygen releases spaced over time, each oxygen release being ordered by said control means when said value falls below said predetermined oxygen concentration threshold. The advantage of this type of configuration lies in the ability to fill the closed enclosure several times in succession, and thus continuously enable catalytic recombination of the hydrogen created in the enclosure, without forming an oxygen pressure surge therein.

Moreover, this principle may be carried out by any single source of oxygen that may be activated several times in succession, for example by opening/closing, or with a plurality of oxygen sources, for example each dedicated to a given release. Nevertheless, other scenarios may be envisaged, such as activating a plurality of sources during a single oxygen release.

In this respect, regardless of the technology used for said oxygen release means, said means preferably comprise a plurality of sources of gaseous oxygen placed in said closed enclosure, said control means comprising a sequencer connected to said sources so as to be able to order the activation thereof in a sequential manner.

In this hypothesis of successive releases, said control means are preferentially devised to set a minimum time interval between two directly consecutive oxygen releases. This makes it possible to avoid causing one or a plurality of untimely oxygen releases, immediately after a given release. Indeed, this risk exists if the oxygen release ordered in a predetermined quantity is performed slowly and the oxygen concentration sensor continues to supply a value below the threshold, in the moments following this release. A further cause may lie in the slow homogenisation of the oxygen concentration inside the closed enclosure, following an oxygen release.

For example, for this purpose, said control means could comprise a time delay activated after each oxygen release, preferably automatically. The time delay may apply a delay time of several hours, for example 24 hours.

As mentioned above, all the features described above may be implemented not by tracking the value of the predetermined oxygen concentration detected directly or indirectly, but by tracking the hydrogen concentration indirectly providing data on the oxygen concentration inside the closed enclosure.

In this respect, it may thus be envisaged that said means for obtaining data on the oxygen concentration are connected to the control means so as to provide same with a value of the hydrogen concentration inside said closed enclosure, said control means being devised to order the release means to release oxygen, preferably in a predetermined quantity, when said value exceeds a predetermined hydrogen concentration limit.

With this preferred configuration, the control means thus automatically order the release of oxygen when the hydrogen concentration exceeds the predetermined limit. For example, once the oxygen release has been ordered, it may be maintained while the value of the hydrogen concentration provided by the detection means remains above the abovementioned limit. In such a case, the release of oxygen is stopped once the limit is reached, and a further release of oxygen is only ordered when the detected value again exceeds the predetermined limit.

Alternatively, it is possible to ensure that, once the oxygen release has been ordered, a predetermined quantity of oxygen is introduced into the enclosure, said predetermined quantity being for example set such that, following the release thereof in said closed enclosure, the hydrogen concentration is reduced to a predetermined value below the limit.

Also preferentially, said means for obtaining data on the oxygen concentration are detection means for detecting the hydrogen concentration inside said closed enclosure, preferably of the hydrogen concentration sensor type. Nevertheless, alternative solutions may be envisaged, wherein the means for obtaining data on the hydrogen concentration are not devised to detect the hydrogen concentration directly, said concentration being obtained indirectly on the basis of one or a plurality of other values correlated therewith, such as a concentration value of another gas found in the enclosure. Estimations and/or calculations known to those skilled in the art may then be used, on the basis of one or a plurality of these detected concentration values, to obtain data on the hydrogen concentration inside said closed enclosure, to compare same to the predetermined hydrogen concentration threshold.

Moreover, in the preferred scenario of the use of detection means for detecting the hydrogen concentration inside said closed enclosure, said means preferentially comprise one or a plurality of hydrogen concentration sensors, arranged inside said closed enclosure.

Finally, it is specified that the means for obtaining data on the oxygen concentration may indeed provide a hydrogen concentration value as described above, but alternatively provide a value of the concentration of one or a plurality of gases contained in the enclosure, including hydrogen and carbon monoxide, or hydrocarbons, $I_2$, $Cl_2$ or $CO_2$.

Preferentially, said control means are arranged outside said closed enclosure, and powered electrically by a power supply also arranged outside said closed enclosure, although these members could be positioned in the enclosure, without falling outside the scope of the invention.

Preferably, said means for releasing oxygen comprise at least one solid gaseous oxygen source placed inside said closed enclosure, each solid source comprising an oxidant compound capable of releasing gaseous oxygen by means of thermal decomposition. This technical solution, wherein the oxidant compound is preferably sodium chlorate or perchlorate, is perfectly suitable, since it remains compact and thus facilitates installation in the enclosure, but also due to the fact that it gives a precise indication of the volume of gaseous oxygen release for a given solid mass.

As such, each solid source preferably comprises a system for the electrical activation of the thermal decomposition of the oxidant compound, said activation system being electrically connected to said control means capable of activating same.

According to a further preferred embodiment of the present invention, the device for the controlled release of oxygen comprises:

- controllable oxygen release means for releasing oxygen inside said closed enclosure; and
- means for controlling said oxygen release means, for ordering the release means, optionally subject to conditions, to perform a plurality of successive oxygen releases, at a plurality of predetermined times, respectively.

In this way, unlike the previous embodiment, this embodiment is based on the principle of successive oxygen releases at predetermined time intervals, and not on the tracking of the oxygen concentration inside the enclosure, although the oxygen concentration may indeed be subject to a condition determining the release order, as described hereinafter. Naturally, any other conditions deemed useful by those skilled in the art may be adopted, without falling outside the scope of the invention.

Nevertheless, it may be envisaged for the means for controlling said oxygen release means to be devised to order the release means, without conditions, to release oxygen at each of said plurality of predetermined times.

On the other hand, it may alternatively be envisaged that said device for the controlled release of oxygen further comprises means for obtaining data on the oxygen concentration inside said closed enclosure, and that said means for obtaining data on the oxygen concentration are connected to the control means so as to provide same with a value of the oxygen concentration inside said closed enclosure, said control means being devised to order at each of said plurality of predetermined times the release means to release oxygen, provided that said value provided is less than the predetermined oxygen concentration value. This guarantees that, after the oxygen release, the concentration thereof in the enclosure will remain acceptable. Therefore, this condition verified prior to each oxygen release represents a safety approach to reduce the risks of over-oxygenation inside the transport and/or storage device.

Preferably, said means for obtaining data on the oxygen concentration are detection means for detecting the oxygen concentration inside said closed enclosure. Nevertheless, the alternatives envisaged for the previous embodiment are also applicable in this case. Similarly, the other constituent members of the controlled oxygen release device, described above in relation to the previous embodiment, are also applicable to this preferred embodiment.

Preferentially, each oxygen release ordered gives rise to a release of a predetermined quantity of oxygen.

The invention also relates to a method for securing a device for transporting and/or storing radioactive materials, comprising a closed enclosure and a system for securing said closed enclosure, said system comprising catalytic means for recombining hydrogen and oxygen into water, placed in said closed enclosure. According to the invention, a controlled oxygen release is performed in said closed enclosure, preferably in an automated manner.

Further advantages and features of the invention will emerge in the non-limitative detailed description hereinafter.

BRIEF DESCRIPTION OF THE DRAWINGS

This description will be made with reference to the appended figures wherein.

DETAILED DESCRIPTION OF PREFERRED EMBODIMENTS

Figure 1:
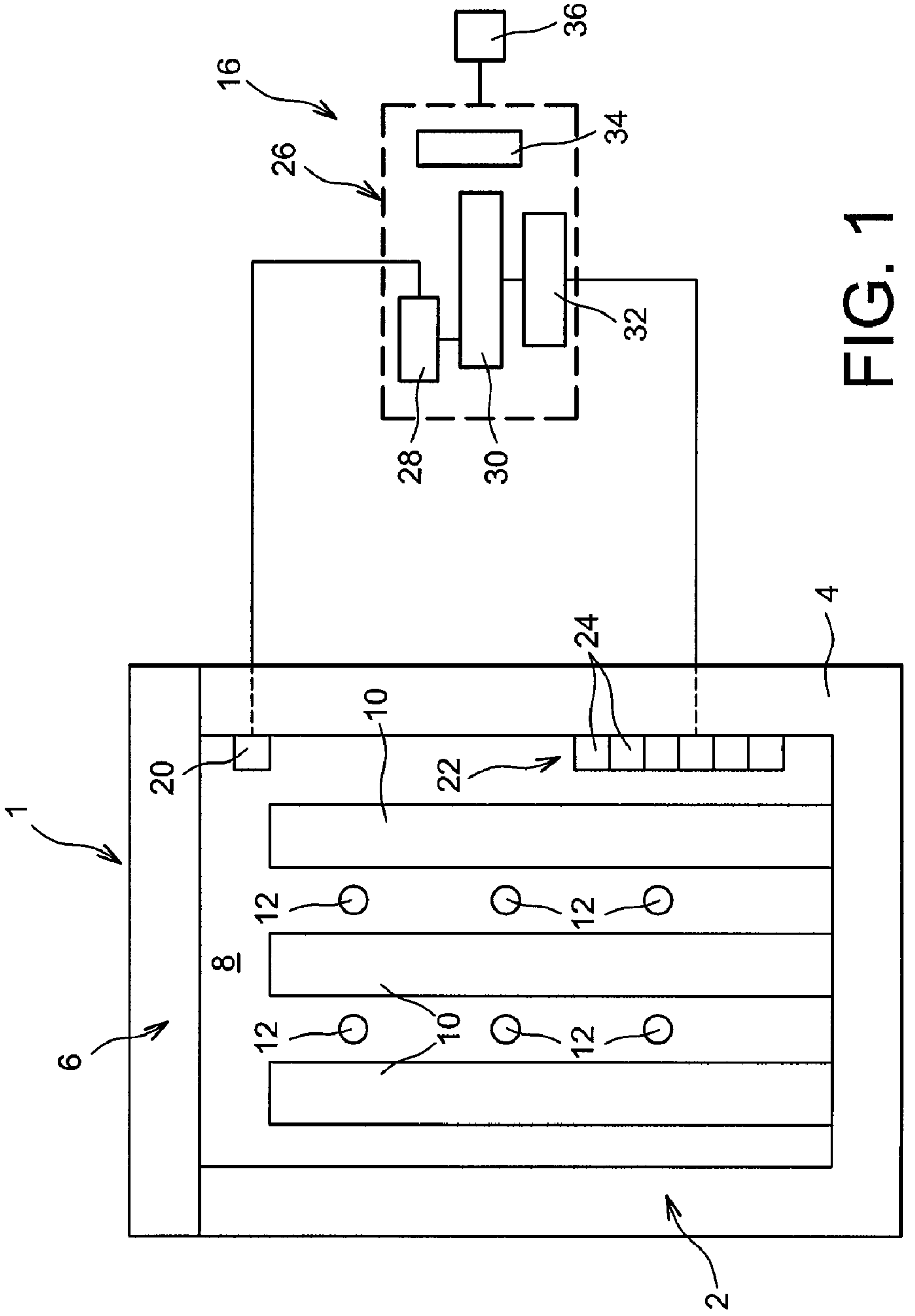
FIG. 1 represents a schematic longitudinal section view of a device for transporting and/or storing radioactive materials, according to a preferred embodiment of the present invention.

Firstly, with reference to FIG. 1, a device 1 for transporting and/or storing radioactive materials, also referred to as a container, can be seen, in the form of a preferred embodiment of the present invention.

Overall, the device 1 comprises a lateral body 2, a base 4 optionally integral with the body 2, and a cover 6 mounted in a fixed manner thereon. These members jointly form a closed enclosure 8, wherein the radioactive materials 10, such as waste containers, are housed.

The device 1 comprises a system for securing the closed enclosure 8, this system firstly comprising active means, including a plurality of catalysts 12 for recombining oxygen and hydrogen into water, and a desiccant agent (not shown).

As represented in FIG. 1, the catalysts 12 are preferably distributed in the enclosure 8, so as to avoid local hydrogen concentrations.

Furthermore, the system for securing the closed enclosure comprises a device 16 for the controlled release of oxygen in the enclosure 8, intended to perform the catalytic recombination of hydrogen throughout the radioactive material transport and/or storage period. Consequently, the controlled oxygen release authorised by the device 16 particularly makes it possible to handle scenarios wherein all the oxygen initially contained in the enclosure was used up.

The device 16 firstly comprises detection means 20 for detecting the oxygen concentration inside the enclosure, said means preferably taking the form of one or a plurality of oxygen sensors 20 arranged in the enclosure 8, these sensors possibly taking any form known to those skilled in the art.

It also comprises controllable oxygen release means 22, for releasing oxygen inside the enclosure 8. In the preferred embodiment described, these means 22 housed in the enclosure comprise a plurality of solid sources 24 of gaseous oxygen, said solid source 24 comprising an oxidant compound such as sodium chlorate or perchlorate, capable of releasing gaseous oxygen by means of thermal decomposition.

Finally, the device 16 comprises means 26 for controlling the sources 24. These control means, preferably in the form of an electronic control unit, firstly comprise means 28 for acquiring an oxygen concentration value supplied continuously by the sensor 20 whereto said means 28 are connected. They also make it possible to compare this value to a predetermined oxygen concentration threshold in the enclosure, set for example between 3 and 6%, and preferably around 5%.

These control means also have means 30 for ordering a release of oxygen contained in the sources 24. Consequently, the means 30 are capable of generating a signal, for example an electric current, giving rise to the thermal decomposition of one of the solid sources 24, said signal transiting via a sequencer 32 connected to the sources 24 and used to route this signal to one of these sources that has not yet been used up. Indeed, the device 16 is devised to enable a plurality of oxygen releases spaced over time, each oxygen release being preferably performed by only activating one of the sources 24.

For this purpose, the control means 26 comprise a time delay 34 setting a minimum time interval between two directly consecutive oxygen releases, thus between the activation of two sources 24, this interval for example being set at approximately 24 hours.

It is noted that the control means 26 are preferably situated outside the enclosure 8, like the electrical power supply 36 thereof, which may optionally be integrated therein.

Figure 2:
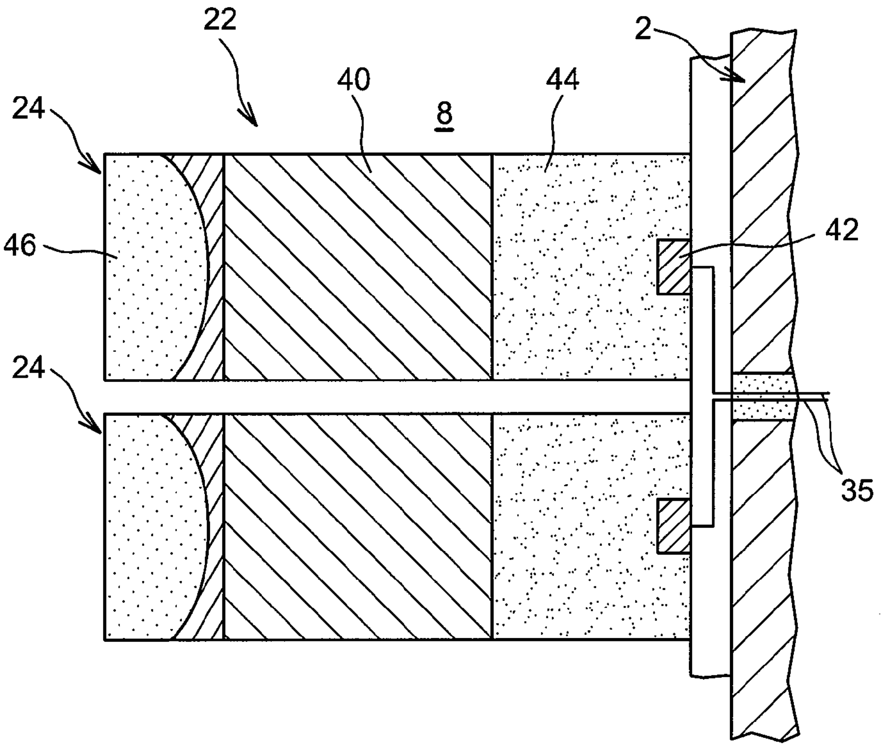
FIG. 2 represents a view of the means for releasing oxygen fitted in the transport and/or storage device shown in FIG. 1.

Consequently, as represented schematically in FIG. 2, the electrical connections 35 between the sequencer 32 and the solid sources 24 pass in a tight manner through the side body 2, such a connection also being provided between the sensor 20 and the means 28 for acquiring and comparing the oxygen concentration value.

As mentioned above, each solid source 24 comprises an oxidant compound 40 capable of releasing gaseous oxygen by means of thermal decomposition. Preferably, this oxidant compound consists of a block of sodium chlorate or perchlorate. For this purpose, each solid source may consist of an oxygen cartridge/candle comprising an electrical thermal decomposition activation system, said system possibly taking the form of an ignition pellet 42. The ignition pellet 42 receiving the electrical signal from the means 30 and the sequencer 32, via the wired electrical connection 35 connected to said pellet, induces the combustion of an electrical relay 44 of the candle, making it possible to maintain the thermal decomposition of the sodium chlorate or perchlorate 40, until same is entirely used up. The gaseous oxygen released from this decomposition passes through a filter 46 of the candle, intended to trap harmful species resulting from said decomposition, such as soot, etc.

The mass of the sodium chlorate or perchlorate block 40 gives a precise indication of the quantity of gaseous oxygen released therefrom during the thermal decomposition thereof. It is thus easily possible to control the quantity of oxygen introduced into the enclosure following the oxygen release order issued by the control means 26, said quantity of oxygen being preferably set such that, following the release thereof in said closed enclosure, the oxygen concentration is raised to a value between 20 and 30%, and preferably in the region of 25%.

The operation of the device 16 will now be described, particularly with reference to FIG. 3.

During the radioactive material storage and/or transport period in the enclosure, the sensor 20 regularly and continuous outputs an oxygen concentration value, to the means 28 which compare same the predetermined threshold. While the value is above the threshold, no action is taken. On the other hand, if the value falls below the threshold, implying that the remaining quantity of oxygen is insufficient to ensure satisfactory catalytic recombination of the hydrogen in the enclosure, an oxygen release order is automatically output by the means 30. Via the sequencer 32, this order in the form of an electrical signal is routed to one of the solid sources 24 which has not yet been used up, and activates the ignition pellet 42 of the same source. The gaseous oxygen is then released from this source as described above, in a known quantity, of up to several litres. The release may take several minutes or more.

Figure 3:
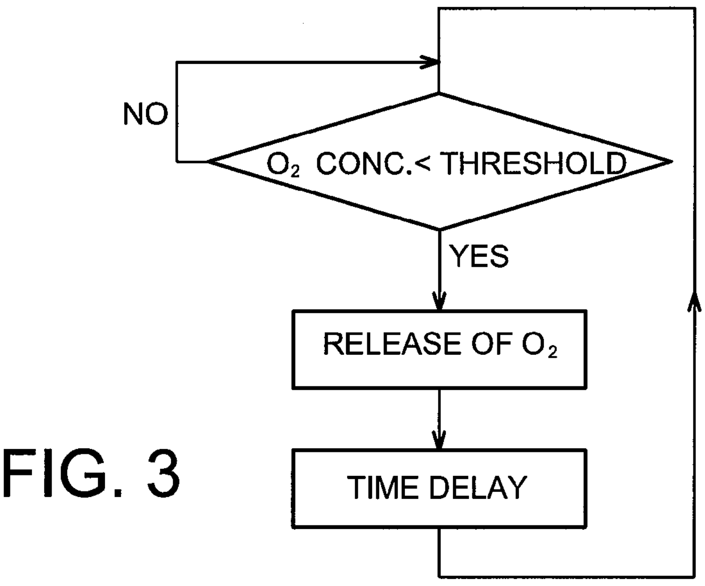
FIG. 3 represents a diagram illustrating the operation of the controlled oxygen release device, comprising means for releasing oxygen shown in FIG. 2.

As represented schematically in FIG. 3, the oxygen release order is immediately followed by a time delay applied by the timer 34, prohibiting the output of a further oxygen release order until a given time interval has elapsed, such as 24 hours. Consequently, during this time interval, although the value of the oxygen concentration detected by the sensor 20 is less than the threshold, no further order for activating the source 24 can be output.

Once the time delay has elapsed, the value of the oxygen concentration supplied by the sensor 20 is normally close to the desired limit, and thus largely above the threshold. The comparison made by the means 28 is then repeated, pending the detection of the value falling below the predetermined threshold again, which may occur several days, months or years after the previous time.

Figure 4:
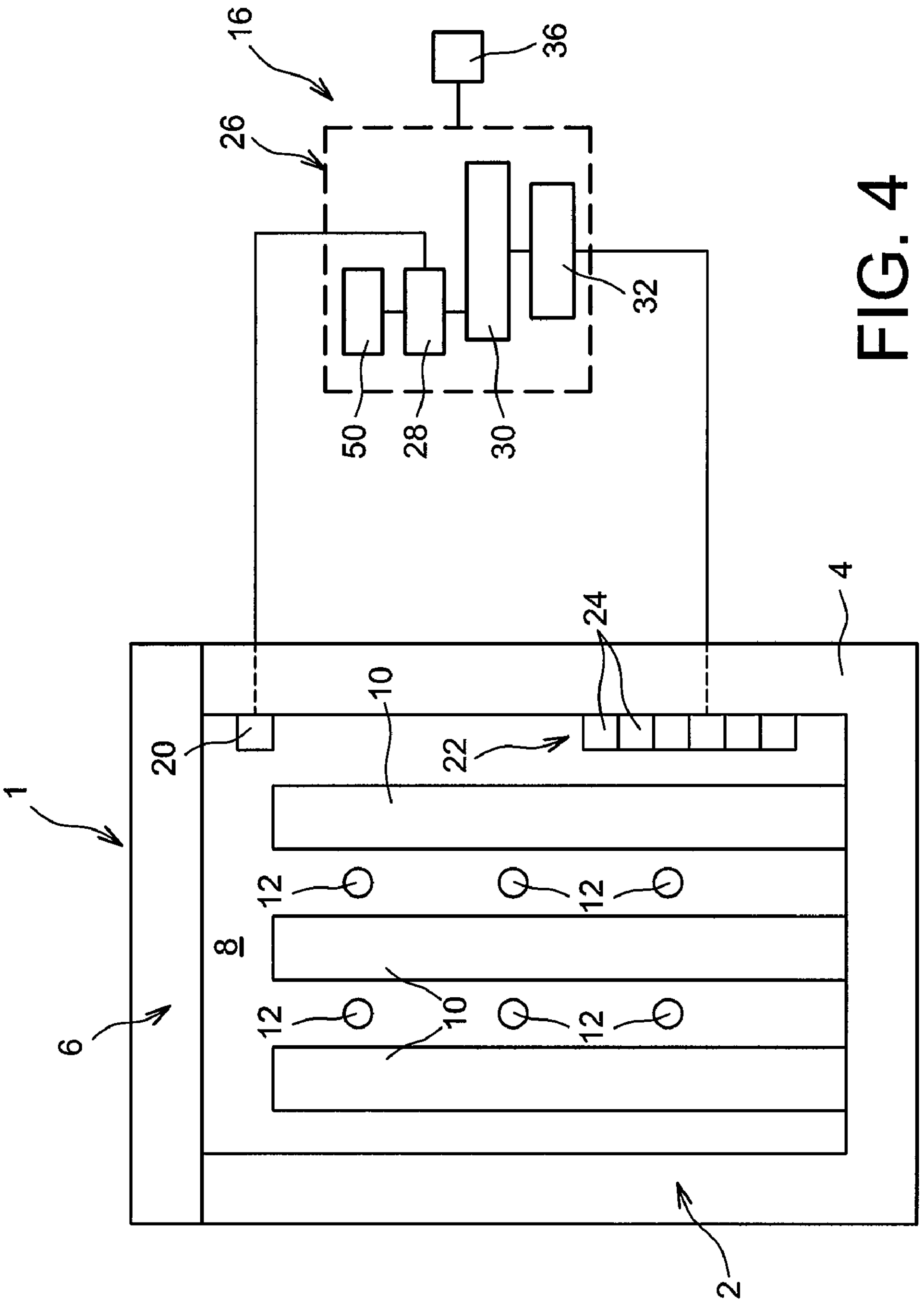
FIG. 4 represents a similar view to that in FIG. 1, with the controlled oxygen release device in the form of a further preferred embodiment.

With reference to FIG. 4, a device 1 for transporting and/or storing radioactive materials, according to another preferred embodiment of the invention, is represented. In this case, only the control means 26 of the device 16 differ from those described above. In this respect, in the figures, the members bearing the same numeric references correspond to identical or similar members.

The means 26 for controlling the sources 24 are still in the form of an electronic control unit. They comprise a timer 50 or equivalent, wherein a plurality of predetermined times T1, T2, . . . , Tn are programmed, these times being spaced from each other with predetermined time intervals, which are preferably regular. For example, the selected time interval is set at several dozen days.

The control means 26 also comprise the means 28 for acquiring an oxygen concentration value supplied by the sensors 20 whereto said means 28 are connected. They also are used to compare this value supplied to a predetermined oxygen concentration value in the enclosure, set for example between 30 and 700, and preferably around 60%.

These control means 26 also have means 30 for ordering a release of oxygen contained in the sources 24, and the sequencer 32 connected to the sources 24 and used to route this signal to one of these sources that has not yet been used up. Indeed, the device 16 is devised to enable a plurality of oxygen releases spaced over time, each oxygen release being preferably performed by only activating one of the sources 24.

Figure 5:
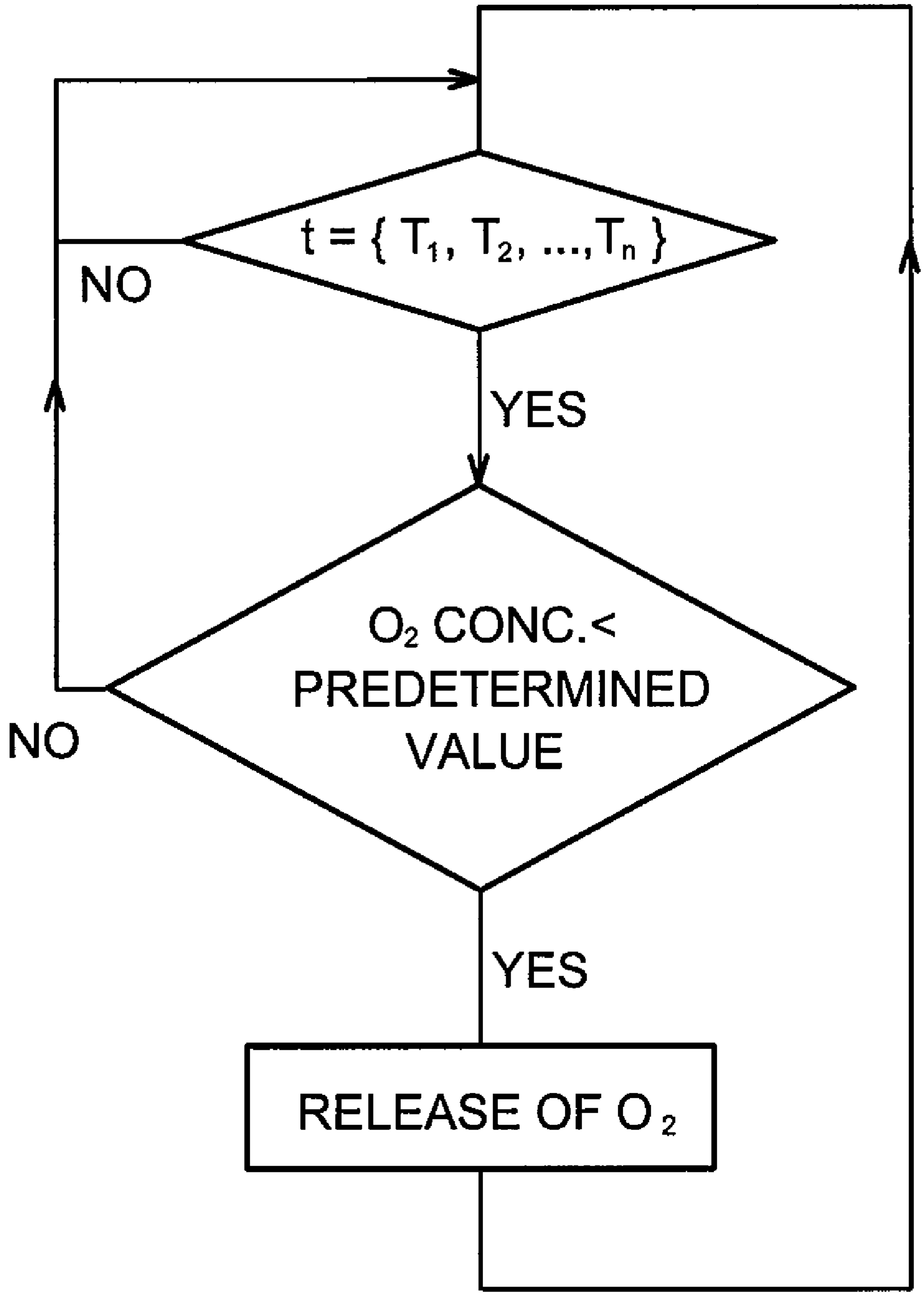
FIG. 5 represents a diagram illustrating the operation of the controlled oxygen release device shown in FIG. 4.

The operation of the device 16 will now be described, particularly with reference to FIG. 5.

During the radioactive material transport and/or storage period in the enclosure, the timer 50 detects the predetermined times T1, T2, . . . , Tn at which an oxygen release could be ordered. When one of these times occurs, before the oxygen is released, the limited oxygen concentration condition is checked by the means 28. Indeed, the sensor 20 outputs an oxygen concentration value to the means 28, comparing same to the predetermined value. In the rarer scenario whereby the value supplied is greater than the predetermined value, conveying an unusual very low oxygen consumption since the previous release, no action is undertaken and no oxygen can be released before the next predetermined time. Since this scenario displays abnormal conditions, an alarm may be activated when it occurs. On the other hand, if the value supplied is less than the predetermined value, an oxygen release order is automatically output by the means 30. Via the sequencer 32, this order in the form of an electrical signal is routed to one of the solid sources 24 which has not yet been used up, and activates the ignition pellet 42 of said source. The gaseous oxygen is then released from this source as described above, in a known quantity, of up to several litres. The release may take several minutes or more. Due to the check of the limited oxygen concentration condition immediately prior to the release order, it is certain that the new oxygen concentration, after the release of a predetermined quantity thereof, will not reach a critical limit synonymous with over-oxygenation.

Once the oxygen release is complete, the means 26 start waiting for a further predetermined time T1, T2, . . . , Tn.

Obviously, various modifications may be made by those skilled in the art to the invention described above, solely as non-limitative examples. In this respect, it is noted that the invention is applicable not only to waste containers as described above, but also to any other type of radioactive materials.

The invention claimed is:

1. Device for transporting and/or storing radioactive material, comprising a closed enclosure and a system for securing said closed enclosure, said system comprising catalytic means for recombining hydrogen and oxygen into water, placed in said closed enclosure, characterised in that the system for securing said closed enclosure further comprises a device for the controlled release of oxygen in said closed enclosure.

2. Device according to claim 1, characterised in that said device for the controlled release of oxygen comprises:

means for obtaining data on the oxygen concentration inside said closed enclosure;

controllable oxygen release means for releasing oxygen inside said closed enclosure; and means for controlling said oxygen release means.

3. Device according to claim 2, characterised in that said means for obtaining data on the oxygen concentration are connected to the control means so as to supply same with a value of the oxygen concentration inside said closed enclosure, said control means being devised to order the release means to release oxygen, preferably in a predetermined quantity, when said value falls below a predetermined oxygen concentration threshold.

4. Device according to claim 3, characterised in that said means for obtaining data on the oxygen concentration are detection means for detecting the oxygen concentration inside said closed enclosure.

5. Device according to claim 4, characterised in that said detection means comprise one or a plurality of oxygen concentration sensors, arranged inside said closed enclosure.

6. Device according to claim 3, characterised in that said device for the controlled release of oxygen is devised to enable a plurality of oxygen releases spaced over time, each oxygen release being ordered by said control means when said value falls below said predetermined oxygen concentration threshold.

7. Device according to claim 2, characterised in that said control means are devised to set a minimum time interval between two directly consecutive oxygen releases.

8. Device according to claim 7, characterised in that said control means comprise a time delay activated after each oxygen release.

9. Device according to claim 1, characterised in that said device for the controlled release of oxygen comprises:

controllable oxygen release means for releasing oxygen inside said closed enclosure; and means for controlling said oxygen release means, for ordering the release means, optionally subject to conditions, to perform a plurality of successive oxygen releases, at a plurality of predetermined times (T1, T2, . . . , Tn), respectively.

10. Device according to claim 9, characterised in that the means for controlling said oxygen release means are devised to order the release means, without conditions, to release oxygen at each of said plurality of predetermined times (T1, T2, . . . , Tn).

11. Device according to claim 9, characterised in that said device for the controlled release of oxygen further comprises means for obtaining data on the oxygen concentration inside said closed enclosure, and in that said means for obtaining data on the oxygen concentration are connected to the control means so as to provide same with a value of the oxygen concentration inside said closed enclosure, said control means being devised to order at each of said plurality of predetermined times (T1, T2, . . . , Tn) the release means to release oxygen, provided that said value provided is less than the predetermined oxygen concentration value.

12. Device according to claim 11, characterised in that said means for obtaining data on the oxygen concentration are detection means for detecting the oxygen concentration inside said closed enclosure.

13. Device according to claim 9, characterised in that each oxygen release ordered gives rise to release of a predetermined quantity of oxygen.

14. Method for securing a device for transporting and/or storing radioactive materials, comprising a closed enclosure and a system for securing said closed enclosure, said system comprising catalytic means for recombining hydrogen and oxygen into water, placed in said closed enclosure, characterised in that a controlled oxygen release is performed in said closed enclosure.

* * * * *